(12) United States Patent
Jinno

(10) Patent No.: US 11,333,603 B2
(45) Date of Patent: May 17, 2022

(54) PROCESSING APPARATUS, PROCESSING METHOD, AND STORAGE MEDIUM

(71) Applicant: CANON KABUSHIKI KAISHA, Tokyo (JP)

(72) Inventor: Takayuki Jinno, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 258 days.

(21) Appl. No.: 16/661,431

(22) Filed: Oct. 23, 2019

(65) Prior Publication Data

US 2020/0132601 A1 Apr. 30, 2020

(30) Foreign Application Priority Data

Oct. 30, 2018 (JP) .............................. JP2018-204382
Jul. 11, 2019 (JP) .............................. JP2019-129615

(51) Int. Cl.
*G01N 21/552* (2014.01)
*G06T 7/90* (2017.01)

(52) U.S. Cl.
CPC ............ *G01N 21/552* (2013.01); *G06T 7/90* (2017.01); *G06T 2207/10024* (2013.01)

(58) Field of Classification Search
CPC .................... G01N 21/552; G06T 7/90; G06T 2207/10024
See application file for complete search history.

(56) References Cited

U.S. PATENT DOCUMENTS

| | | | | |
|---|---|---|---|---|
| 2006/0126902 A1* | 6/2006 | Matsuda | ............. | G01B 11/303 382/108 |
| 2008/0205752 A1* | 8/2008 | Itoh | ........................ | G06K 9/346 382/163 |
| 2009/0284627 A1* | 11/2009 | Bando | .................... | H04N 5/232 348/273 |
| 2010/0086218 A1* | 4/2010 | Tateno | ............... | G06K 9/00208 382/203 |
| 2011/0274351 A1* | 11/2011 | Tsukada | ................. | H04N 1/628 382/167 |
| 2015/0235382 A1* | 8/2015 | Hasegawa | ............. | G09G 5/003 345/591 |
| 2015/0278996 A1* | 10/2015 | Tsutsumi | ............. | H04N 13/243 348/47 |
| 2016/0007009 A1* | 1/2016 | Offenberg | ............... | G01S 17/86 348/46 |

(Continued)

FOREIGN PATENT DOCUMENTS

JP 2014-211322 A 11/2014

*Primary Examiner* — Sang H Nguyen
(74) *Attorney, Agent, or Firm* — Canon U.S.A., Inc. IP Division

(57) ABSTRACT

A processing apparatus includes an acquisition unit configured to acquire a plurality of pieces of color image data respectively representing a plurality of color images, a determining unit configured to determine a degree of correlation between at least two color values among a plurality of types of color values included in each of a plurality of pixel values corresponding to a pixel position in the plurality of color images, and a determination unit configured to determine, based on the determined degree of correlation, whether a feature related to a direction of light reflected from an object appears in the plurality of pixel values corresponding to the pixel position.

19 Claims, 15 Drawing Sheets

(56) References Cited

U.S. PATENT DOCUMENTS

| | | | |
|---|---|---|---|
| 2016/0125611 A1* | 5/2016 | Komatsu | G06K 9/6289 |
| | | | 348/135 |
| 2016/0239977 A1* | 8/2016 | Komatsu | G06T 7/174 |
| 2016/0261793 A1* | 9/2016 | Sivan | H04N 19/597 |
| 2017/0205291 A1* | 7/2017 | Shimada | G01N 21/57 |
| 2019/0216305 A1* | 7/2019 | Fukuda | A61B 1/045 |

\* cited by examiner

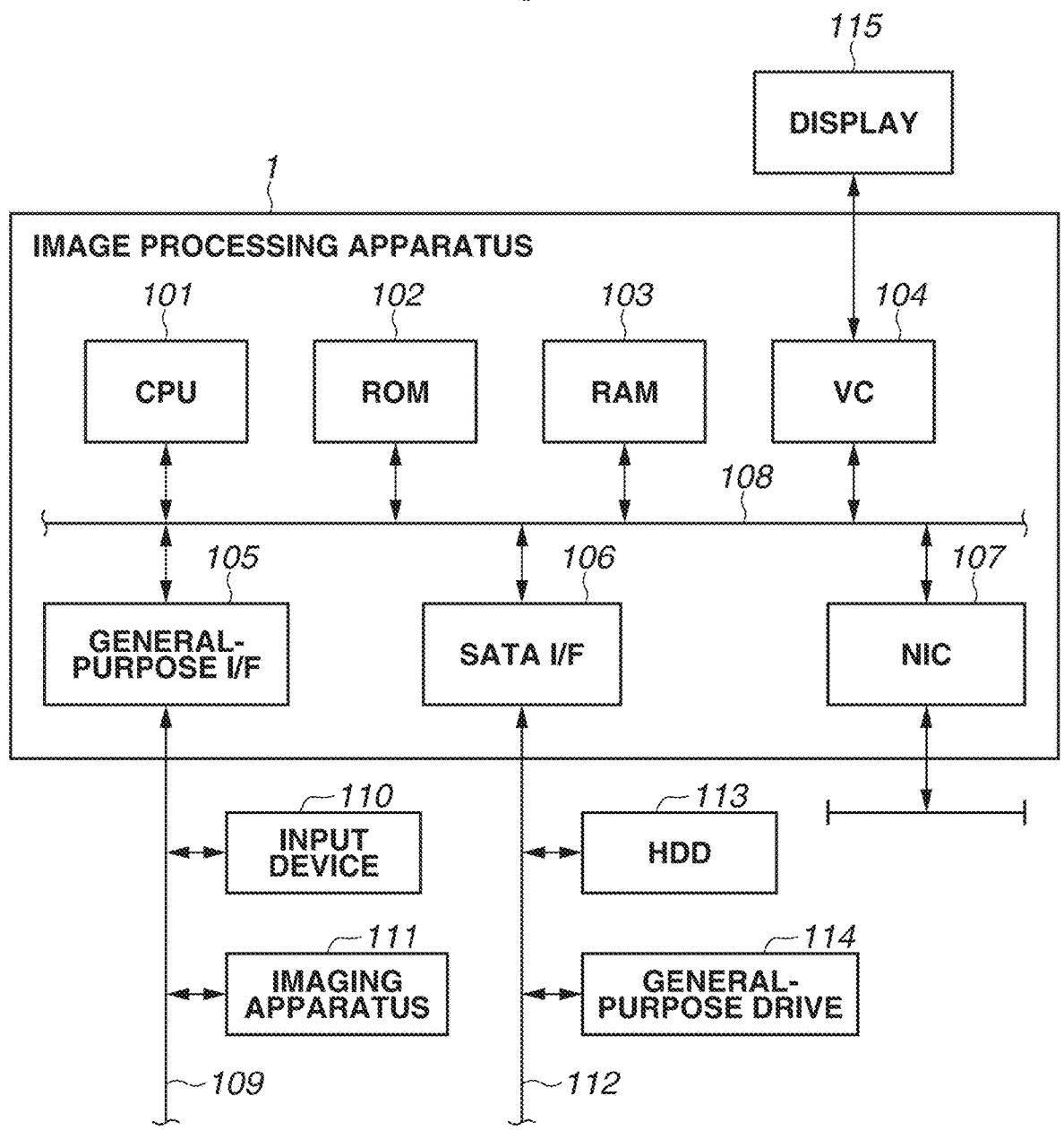

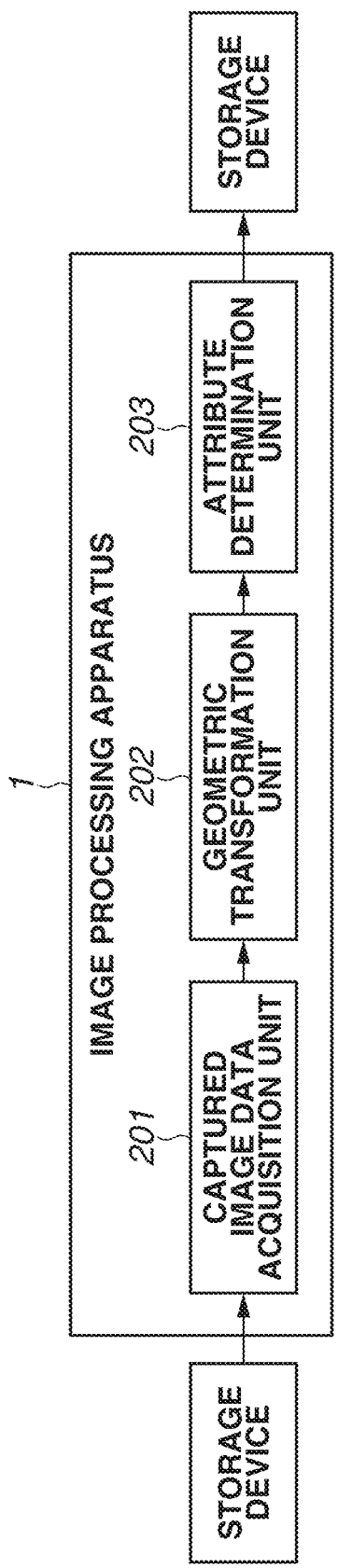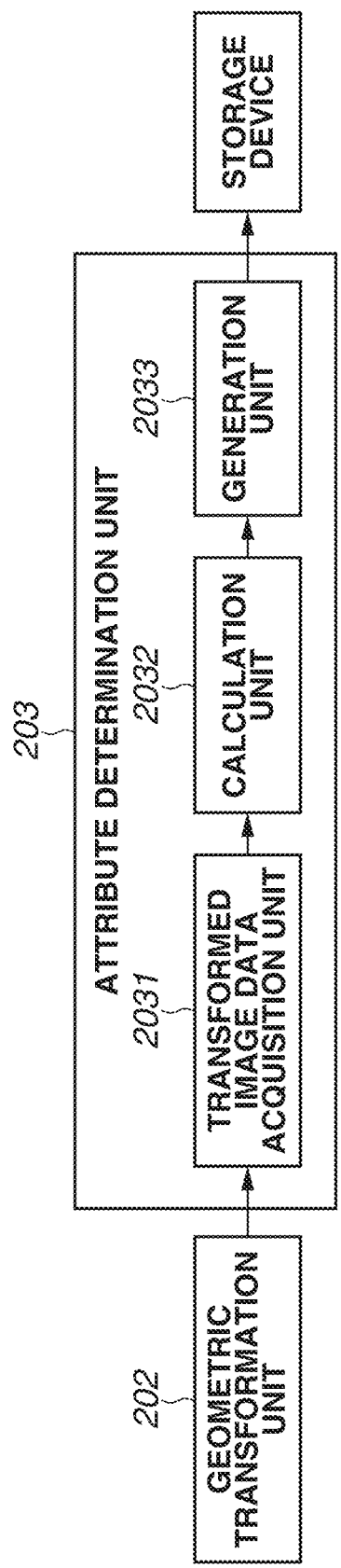

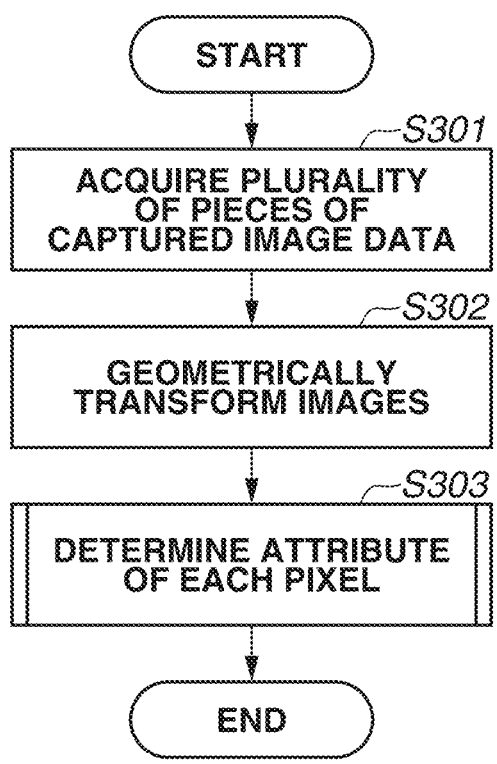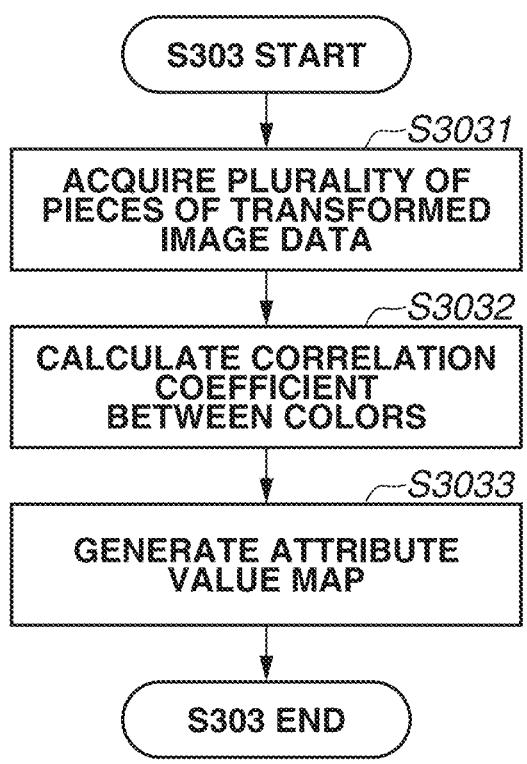

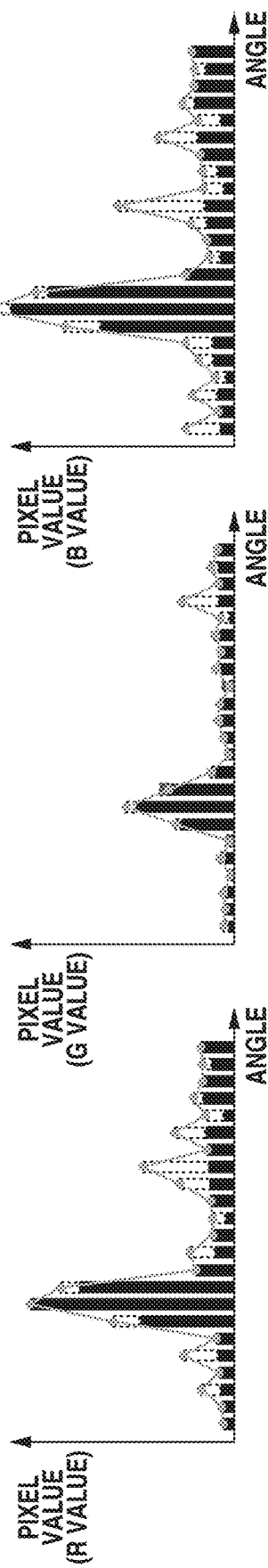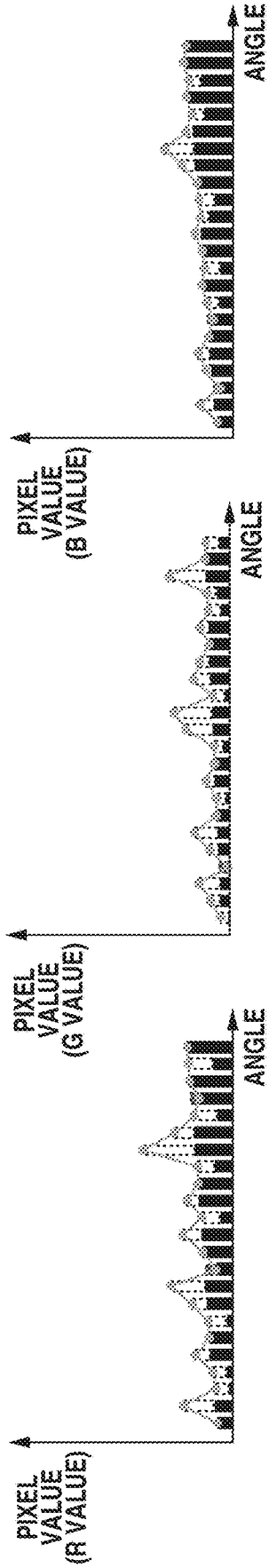

FIG.13

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 1 | 0 | 0 | 0 | 1 | 0 |   |
| 0 | 1 | 0 | 0 | 0 | 0 | 1 | 0 | 0 | 0 | 0 | 0 | 0 | 0 | 0 |   |
| 0 | 0 | 0 | 0 | 0 | 0 | 0 | 1 | 0 | 0 | 0 | 0 | 0 | 0 | 0 |   |
| 0 | 0 | 0 | 0 | 0 | 0 | 0 | 0 | 0 | 0 | 0 | 0 | 0 | 0 | 0 |   |
| 0 | 0 | 0 | 0 | 0 | 0 | 0 | 0 | 0 | 0 | 0 | 0 | 0 | 0 | 0 |   |
| 0 | 0 | 0 | 1 | 0 | 0 | 0 | 0 | 0 | 0 | 0 | 1 | 0 | 0 | 0 |   |
| 0 | 0 | 0 | 0 | 0 | 0 | 0 | 1 | 0 | 0 | 0 | 0 | 0 | 0 | 0 |   |
| 0 | 0 | 0 | 0 | 0 | 0 | 0 | 0 | 0 | 0 | 0 | 0 | 0 | 0 | 0 |   |

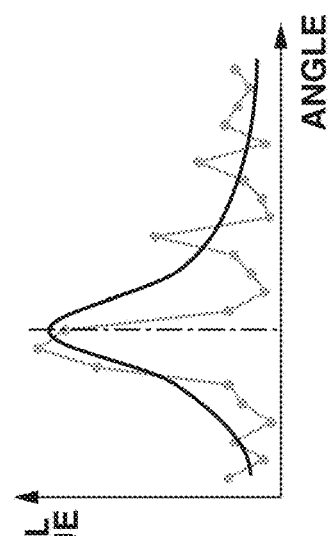
FIG.15A
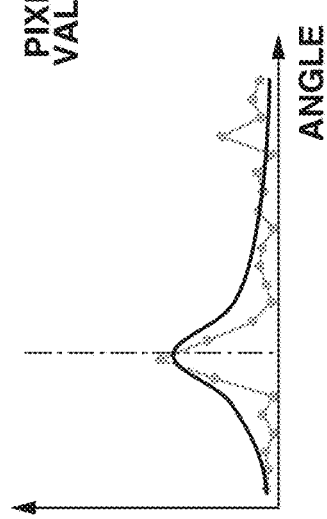
FIG.15B
FIG.15C
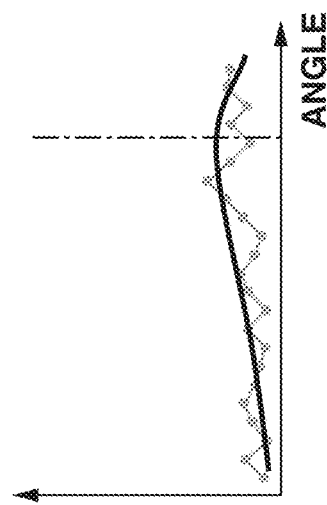
FIG.15D
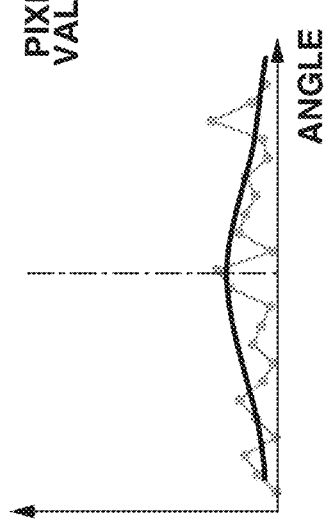
FIG.15E
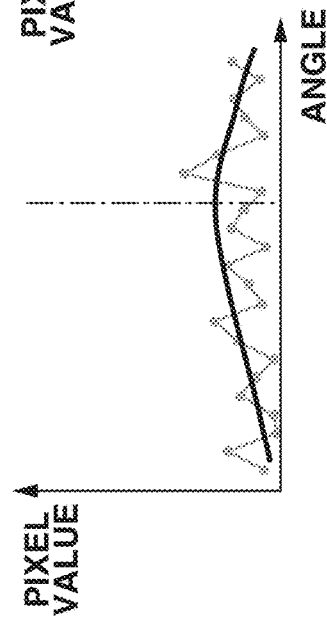
FIG.15F

PROCESSING APPARATUS, PROCESSING METHOD, AND STORAGE MEDIUM

BACKGROUND OF THE INVENTION

Field of the Invention

The aspect of the embodiments relates to an image processing technique for acquiring a reflection characteristic of an object.

Description of the Related Art

To express a texture of a material or painting of an object, there has been known a technique for measuring a reflection characteristic that is a reflectance different depending on a direction of light emitted to the object from a light source and a direction in which the object is observed. Japanese Patent Application Laid-Open No. 2014-211322 discusses a technique for measuring the reflection characteristic of an object using an imaging apparatus.

However, in a case where the reflection characteristic of an object is measured using an imaging apparatus as in Japanese Patent Application Laid-Open No. 2014-211322, a captured image contains noise due to an image sensor. Thus, there is an issue that it is not possible to identify whether a reflectance peak in the reflection characteristic obtained based on the captured image is a peak due to the noise or a reflectance peak corresponding to the reflection characteristic of the object.

SUMMARY OF THE INVENTION

According to an aspect of the embodiments, a processing apparatus that determines a feature of an object based on a plurality of color Images obtained by capturing images of the object under a plurality of geometric conditions depending on a position of an imaging apparatus and a position of a light source that emits light to the object and in which a color of each pixel is represented by a plurality of types of color values includes an acquisition unit configured to acquire a plurality of pieces of color image data respectively representing the plurality of color images, a determining unit configured to determine a degree of correlation between at least two color values among the plurality of types of color values included in each of a plurality of pixel values corresponding to a pixel position in the plurality of color images, and a determination unit configured to determine, based on the determined degree of correlation, whether a feature related to a direction of light reflected from the object appears in the plurality of pixel values corresponding to the pixel position.

Further features of the disclosure will become apparent from the following description of exemplary embodiments with reference to the attached drawings.

BRIEF DESCRIPTION OF THE DRAWINGS

FIG. 1 is a block diagram illustrating a hardware configuration of an image processing apparatus.

FIGS. 2A and 2B are block diagrams illustrating functional configurations of the image processing apparatus.

FIGS. 3A and 3B are flowcharts illustrating processing executed by the image processing apparatus.

FIGS. 7A, 7B, 7C, 7D, 7E, and 7F are graphs each illustrating a relationship between the geometric condition and a red (R) value, a green (G) value, or a blue (B) value.

FIG. 13 is a diagram schematically illustrating an example of an attribute value map.

FIGS. 15A, 15B, 15C, 15D, 15E, and 15F are graphs each illustrating a correlation between colors in a reflection characteristic.

DESCRIPTION OF THE EMBODIMENTS

Figure 4A:
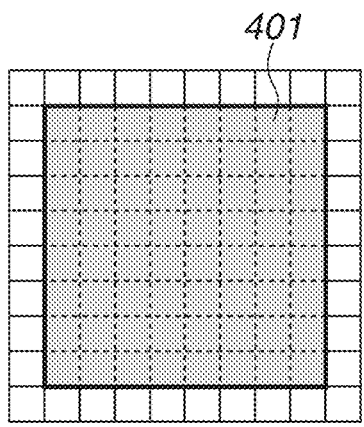
FIGS. 4A, 4B, and 4C are diagrams schematically illustrating examples of captured images.

Exemplary embodiments of the disclosure will be described below with reference to the drawings. The following exemplary embodiments do not necessarily limit the disclosure, and not all of combinations of the features described in the present exemplary embodiments are essential for means for solving the issues in the disclosure.

Hardware Configuration of Image Processing Apparatus

FIG. 1 is a block diagram illustrating a hardware configuration of an image processing apparatus 1. The image processing apparatus 1 includes a central processing unit (CPU) 101, a read-only memory (ROM) 102, and a random-access memory (RAM) 103. The image processing apparatus 1 further includes a video card (VC) 104, a general-purpose interface (I/F) 105, a Serial AT Attachment (SATA) I/F 106, and a network interface card (NIC) 107. The CPU 101 executes an operating system (OS) and various programs stored in the ROM 102 and the hard disk drive (HDD) 113 using the RAM 103 as a work memory. The CPU 101 controls these components via a system bus 108. Processing in flowcharts described below is executed by the CPU 101 loading a program code stored in the ROM 102 or the HDD 113 into the RAM 103 and executing the program code. To the VC 104, a display 115 is connected. To the general-purpose I/F 105, an input device 110 such as a mouse and a keyboard and an imaging apparatus 111 are connected via a serial bus 109. To the SATA I/F 106, the HDD 113 and a general-purpose drive 114 that reads from and writes to various recording media are connected via a serial bus 112. The NIC 107 outputs info on to external apparatus and inputs information to the image processing apparatus 1 from the external apparatus. The CPU 101 uses the HDD 113 and various recording media mounted on the general-purpose drive 114 as storage locations of various types of data. The CPU 101 displays a graphical user interface (GUI) provided by a program on the display 115 and receives an input such as a user instruction received via the input device 110.

Functional Configuration of Image Processing Apparatus

FIG. 2A is a block diagram illustrating a functional configuration of the image processing apparatus 1. The CPU 101 functions as functional components illustrated in FIG. 2A by reading and executing a program stored in the ROM 102 or the HDD 113 using the RAM 103 as a work memory. Not all of processing described below needs to be executed by the CPU 101. Alternatively, the image processing apparatus 1 may be configured in such a manner that part or all of the processing is executed by one or more processing circuits other than the CPU 101.

The image processing apparatus 1 includes a captured image data acquisition unit 201, a geometric transformation unit 202, and an attribute determination unit 203. The captured image data acquisition unit 201 acquires, from a storage device such as the HDD 113, a plurality of pieces of captured image data obtained by capturing images of an object to be measured under a plurality of geometric conditions, and information regarding the geometric condition corresponding to each of the plurality of pieces of captured image data when the images of the object are captured. The imaging apparatus 111 according to the first exemplary embodiment captures the image of the object while changing a direction from which the image of the object is captured under a condition that light is emitted toward the object from a light source placed in a direction to form an elevation angle of 45°. Further, the information regarding the geometric condition refers to information indicating an incident angle of light on the normal line to a surface of the object and a light-receiving angle of the imaging apparatus 111 to the normal line to the surface of the object. The geometric transformation unit 202 performs a geometric transformation process on images represented by the plurality of pieces of captured image data acquired by the captured image data acquisition unit 201 to associate the same region between the images.

The attribute determination unit 203 determines, with respect to each pixel in each of the geometrically transformed images, whether a reflection characteristic calculated based on transformed image data has a reflectance peak corresponding to the reflection characteristic of the object. FIG. 2B is a block diagram illustrating the configuration of the attribute determination unit 203. The attribute determination unit 203 includes a transformed image data acquisition unit 2031, a calculation unit 2032, and a generation unit 2033. The transformed image data acquisition unit 2031 acquires transformed image data representing a geometrically transformed image. The calculation unit 2032 calculates, with respect to each pixel in the geometrically transformed image, a correlation coefficient representing a degree of correlation between a plurality of color values held by each pixel as pixel values of the pixel. The generation unit 2033, with respect to each pixel in the image represented by the transformed image data, generates an attribute value map in which each pixel has binary information representing whether a reflection characteristic calculated based on the transformed image data has a reflectance peak corresponding to the reflection characteristic of the object. The generation unit 2033 outputs the generated attribute value map to a storage device such as the HDD 113.

Flow of Processing of Image Processing Apparatus

FIG. 3A is a flowchart illustrating processing executed by the image processing apparatus 1. With reference to FIG. 3A, details of the processing executed b the image processing apparatus 1 are described below. The processing illustrated in the flowchart in FIG. 3A is started when a user inputs an instruction via the input device 110 and the CPU 101 receives the input instruction.

In step S301, the captured image data acquisition unit 201 acquires the plurality of pieces of captured image data obtained by capturing images of the object to be measured under the plurality of geometric conditions, and the information regarding the geometric condition corresponding to each of the plurality of pieces of captured image data when the images of the object are captured. Each of the plurality of pieces of captured image data refers to color image data representing a color image in which a red (R) value, a green (G) value, and a blue (B) value are recorded to each pixel. The captured image data acquisition unit 201 acquires the plurality of pieces of captured image data and the information regarding the geometric conditions held in advance in a storage device such as the HDD 113.

Figure 4B:
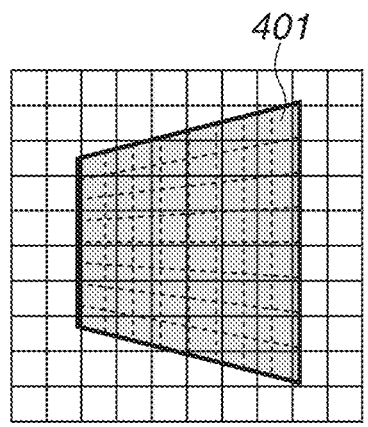
Figure 4C:
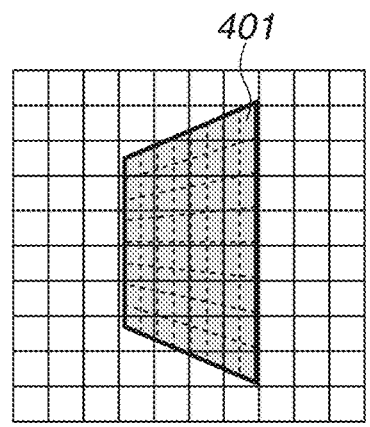

In step S302, the geometric transformation unit 202 performs a geometric transformation process on images represented by the plurality of pieces of captured image data. FIGS. 4A, 4B, and 4C illustrate examples of the images represented by the plurality of pieces of captured image data and acquired by the captured image data acquisition unit 201. The three images illustrated in FIGS. 4A, 4B, and 4C are obtained by capturing images of an object 401 to be measured by fixing an incident angle of light on the object 401 while changing the light-receiving angle of the imaging apparatus 111. FIG. 4A is an image obtained by capturing the object 401 from a position facing the object 401 (at an elevation angle of 90°). FIG. 4B is an image obtained by capturing the object 401 from a position slightly inclined to the normal line to a surface of the object 401 (at an elevation angle of 45°). FIG. 4C is an image obtained by capturing the object 401 from a position further inclined to the normal line to the surface of the object 401 (at an elevation angle of 20°). In FIGS. 4A, 4B, and 4C, squares indicated with solid lines are used to indicate positions in the images, and each of the squares includes a plurality of pixels. Areas divided by dotted lines on the object 401 indicate positions on the surface of the object 401. In an image obtained by capturing an object from a position inclined to the normal line to a surface of the object as in FIGS. 4B and 4C, the greater the inclination is, the greater degree of deformation of the object in the image becomes. Thus, a correspondence relationship between a position on the surface of the object and a pixel position in the image differs between an image obtained by capturing the object from a position facing the object and an image obtained by capturing the object from a position not facing the object. Thus, in step S302, to associate a position on the surface of the object with the same pixel position, based on the image obtained by capturing the object from a position facing the object, the geometric transformation unit 202 geometrically transforms an image obtained by capturing the object from a position inclined to the object. In the present exemplary embodiment, the geometric transformation unit 202 geometrically transforms the image using a known affine transformation based on a feature amount of an image. By this geometric transformation process, it is possible to associate a position on the surface of the object with the same pixel position between images captured under different geometric conditions. The geometrically transformed captured image is referred to as a transformed image, and data representing the transformed image is referred to as transformed image data.

Figure 5A:
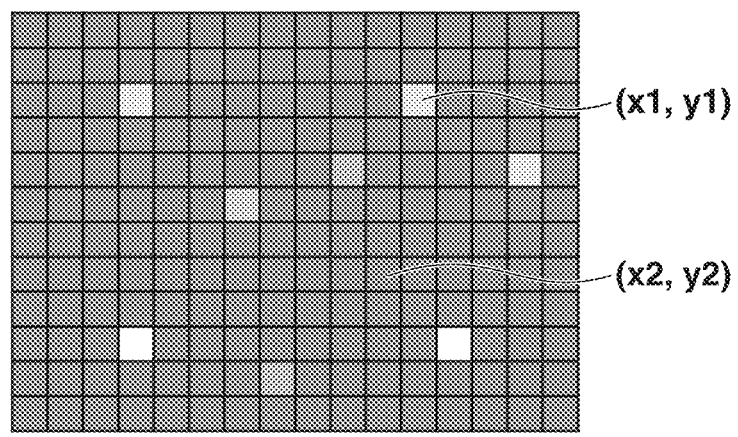
FIGS. 5A and 5B are diagrams schematically illustrating examples of geometrically transformed captured images.
Figure 5B:
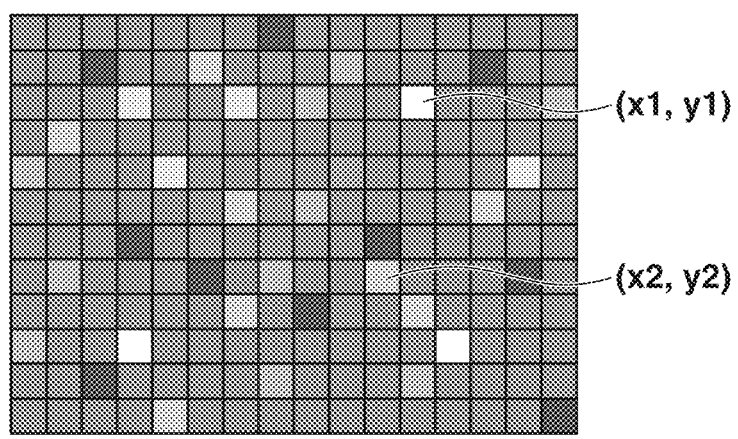
Figure 6A:
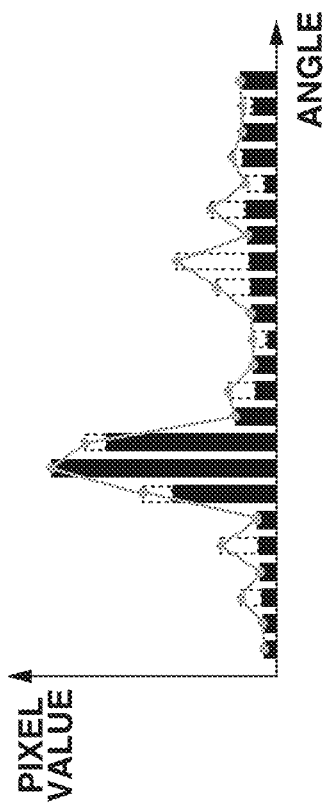
FIGS. 6A, 6B, 6C, and 6D are graphs each illustrating a relationship between a geometric condition and a pixel value.
Figure 6B:
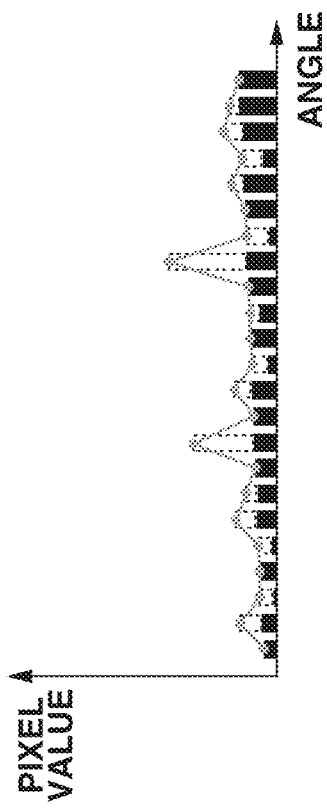

In step S303, the attribute determination unit 203 determines, with respect to each pixel in each of the geometrically transformed images, whether the pixel has a reflectance peak corresponding to the reflection characteristic of the object. First, an outline of a method for determining a peak is described. FIGS. 5A and 5B illustrate examples of the geometrically transformed captured image. Since the images illustrated in FIGS. 5A and 5B are geometrically transformed as described above, a position on the object corresponds to the same pixel position. In the present exemplary embodiment, the images of the object is captured under a plurality of geometric conditions. However, in this case, to indicate a pixel position, an example of one of a plurality of images is described. Each pixel in each image is associated with information indicating under which geometric condition a position on the object is captured based on the geometric condition when the image is captured. FIG. 5A schematically illustrates an image obtained in a case where an ideal imaging apparatus that does not generate noise in an image captures an image of the object to be measured. FIG. 5B schematically illustrates an image obtained in a case where an imaging apparatus that generates noise in an image captures an image of the object to be measured. The image in FIG. 5A and the image in FIG. 5B are images obtained by capturing the object under the same geometric condition. FIGS. 6A, 6B, 6C, and 6D are graphs illustrating a relationship between the geometric condition and the pixel value at each coordinate point of coordinates (x1, y1) and coordinates (x2, y2) in FIGS. 5A and 5B. In the present exemplary embodiment, images are captured under the condition that the incident angle is fixed and the light-receiving angle is changed. Thus, the horizontal axis of each graph represents the light-receiving angle. In FIGS. 6A, 6B, 6C, and 6D, to estimate the reflection characteristic of the object, the pixel value at the same pixel position in a plurality of images is plotted for each light-receiving angle. Based on a change in the pixel value under the geometric condition illustrated in each of FIGS. 6A, 6B, 6C, and 6D, a reflection characteristic at a certain position on the object is estimated. The pixel value in FIGS. 6A, 6B, 6C, and 6D is the R value. In FIGS. 6A, 6B, 6C, and 6D, a solid black bar graph indicates an ideal pixel value that does not include noise, and a dotted bar graph indicates a noise component included in the pixel value. A line graph in each of FIGS. 6A and 6C indicates a change in the pixel value expected to be obtained by capturing an image of the object using the ideal imaging apparatus that does not generate noise. A line graph in each of FIGS. 6B and 6D indicates change in the pixel value expected to be obtained by capturing an image of the object using the imaging apparatus that generates noise. If FIGS. 6A and 6B are compared with each other, the pixel value indicated by each solid black bar graph may differ even at the same light-receiving angle. In this case, as a consequence of a fact that an ideal pixel value is not sufficiently obtained due to sensitivity of a sensor included in the imaging apparatus, even if the pixel value does not contain noise in the graph in FIG. 6B, the pixel value thereof is smaller than an ideal pixel value at the same light-receiving angle in the graph in FIG. 6A. Even if an ideal pixel value is sufficiently obtained, due to addition of noise, the pixel value may be different at the same light-receiving angle between FIGS. 6A and 6B.

Figure 6C:
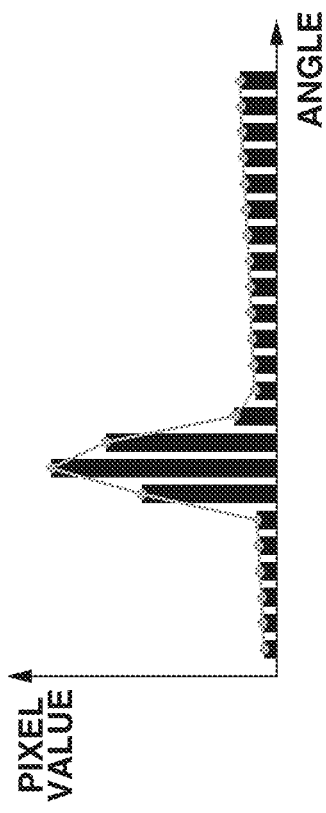

FIG. 6A illustrates a result of deriving a change in the pixel value corresponding to the light-receiving angle at the coordinates (x1, y1) using a plurality of images captured using only the ideal imaging apparatus that does not generate noise as illustrated in FIG. 5A. At a position on the object corresponding to the coordinates (x1, y1), the object has the characteristic that the reflectance changes depending on the geometric condition and the reflectance becomes high under a specular reflection condition. With respect to the position where the object has such a reflection characteristic, if the reflection characteristic is calculated based on a group of pixels at the same pixel position, ideally, a result indicating that the pixel value has one peak is obtained as illustrated in FIG. 6A. FIG. 6C illustrates a change in the pixel value corresponding to the light-receiving angle at the coordinates (x2, y2) in the image in FIG. 5A. At a position on the object corresponding to the coordinates (x2, y2), the object has the reflection characteristic that the reflectance does not change much even if the geometric condition changes. At the position where the object has such a reflection characteristic, if the reflection characteristic is calculated based on a group of pixels at the same pixel position, ideally, as illustrated in FIG. 6C, the pixel value indicates an almost flat change.

Figure 6D:
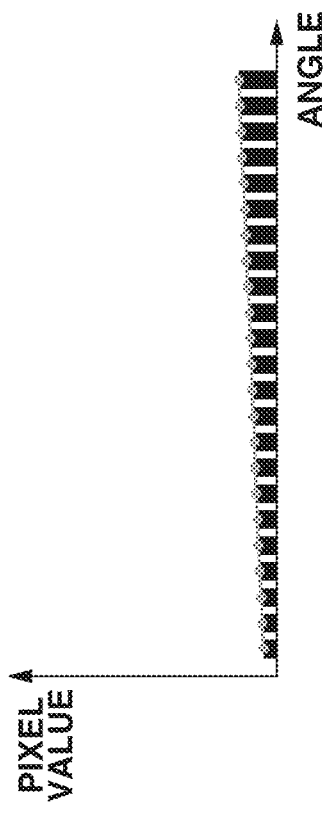

On the other hand, FIG. 6B illustrates a result of deriving a change in the pixel value corresponding to the light-receiving angle at the coordinates (x1, y1) using a plurality of images captured using only the imaging apparatus that generates noise in an image as illustrated in FIG. 5B. In a case where the noise occurs in the image, there is a geometric condition that makes the pixel value large in addition to a peak corresponding to the reflection characteristic of the object. FIG. 6D illustrates a change in the pixel value corresponding to the light-receiving angle at the coordinates (x2, y2) in the image in FIG. 5B. Even though a peak should not occur in the pixel value normally, the pixel value becomes large and a peak appears under an influence of the noise. As described above, in FIGS. 6B and 6D, a plurality of peaks appears in the pixel value, but a peak corresponding to the reflection characteristic of the object is one. More specifically, to obtain the reflection characteristic of the object with high accuracy, a peak corresponding to the reflection characteristic among the plurality of peaks that appears in the pixel value is to be identified. However, it is difficult to identify whether these peaks are peaks corresponding to the reflection characteristic of the object or the noise.

Figure 8:
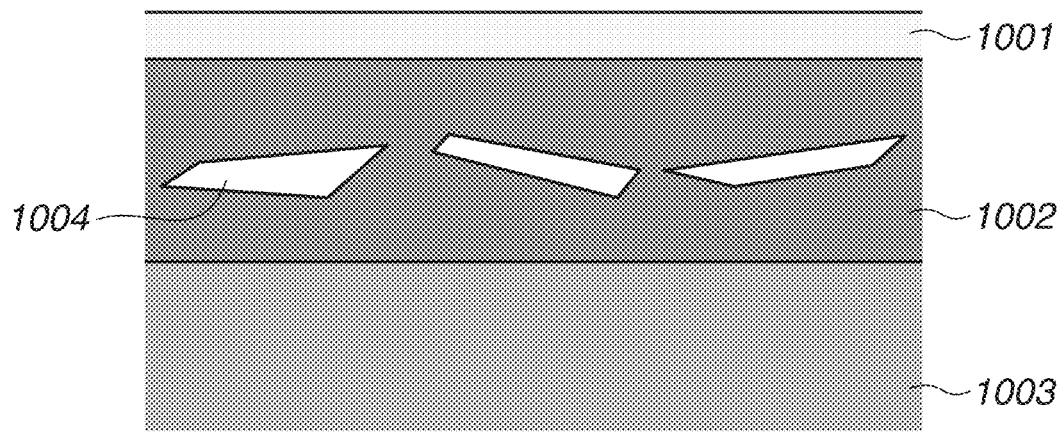
FIG. 8 is a diagram schematically illustrating a cross section of metallic painting.

FIGS. 7A, 7B, 7C, 7D, 7E, and 7F are graphs each illustrating a relationship between the geometric condition and each of color values (R, G, and B values) as the pixel value at each coordinate point of the coordinates (x1, y1) and the coordinates (x2, y2) in FIG. 5B. FIGS. 7A, 7B, and 7C illustrate changes in the R, G, and B values, respectively, corresponding to the light-receiving angle at the coordinates (x1, y1) in the image in FIG. 5B. FIGS. 7D, 7E, and 7F illustrate changes in the R, G, and B values, respectively, corresponding to the light-receiving angle at the coordinates (x2, y2) in the image in FIG. 5B. The R value in FIG. 7A, the G value in FIG. 7B, and the B value in FIG. 7C each include noise. Meanwhile, in FIGS. 7A, 7B, and 7C, the pixel value is large at the angle where the peak of the pixel value that does not contain noise, i.e., the peak corresponding to the reflection characteristic of the object, occurs. Further, it is evident that at an angle other than the angle where the peak of the pixel value that does not contain noise occurs, even if the pixel value is large in the graph of a certain color, the pixel value is not necessarily large in the graph of another color. The reason is described with reference to FIG. 8. FIG. 8 is a diagram schematically illustrating a cross section of metallic painting. The painting in FIG. 8 includes a clear layer 1001 and a colored layer 1002 on a base material 1003. A flake 1004 indicates a metal flake such as aluminum. A surface of the metallic painting for expressing a metallic tone has the reflection characteristic that has a high reflectance peak under a specular reflection condition at a position where the flake 1004 having a high reflectance is included. On the other hand, at a position where the flake 1004 is not included, even under the specular reflection condition, the surface of the metallic painting does not have a reflectance peak as high as that at the position where the flake 1004 is included. The coordinates (x1, y1) and the coordinates (x2, y2) indicate the position where the flake 1004 is included and the position where the flake 1004 is not included, respectively. Regarding light reflected from the flake 1004, during the process in which light is incident on and reflected from the flake 1004, colors at some wavelengths of the light are absorbed by the colored layer 1002, and the light is colored with the same color as that of the colored layer 1002. For example, metallic painting including a purple colored layer has reflectance peaks in the R and B values, More specifically, in the case of an object having a color obtained by mixing two or more colors of R, G, and B, if reflectance peaks occur at the same angle between the different colors, it is more likely that these peaks are peaks corresponding to the reflection characteristic of the object, and a peak other than these peaks is noise. In an imaging apparatus such as a digital camera, readout noise occurs on an element-by-element basis. Thus, it is less likely that noise simultaneously occurs in the R, G, and B values at the same pixel after a debayer process is performed on an image. Thus, it is considered that random noise that has small correlation between colors occurs in the image. In the present exemplary embodiment, using this principle, an attribute of the peak is determined based on the degree of correlation between colors in the pixel value.

FIG. 3B is a flowchart illustrating processing executed by the attribute determination unit 203. With reference to FIG. 3B, details of the processing executed by the attribute determination unit 203 are described below.

Figure 9A:
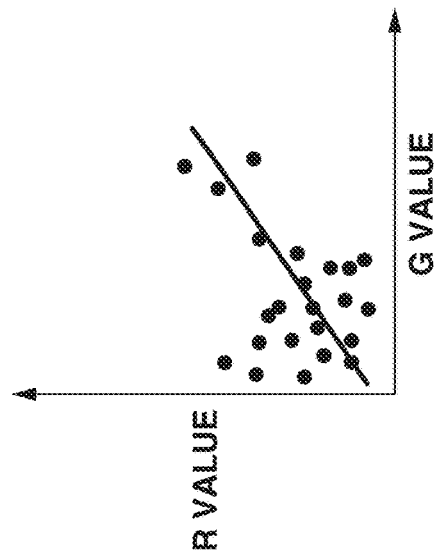
FIGS. 9A, 9B, 9C, 9D, 9E, and 9F are graphs each illustrating a correlation between colors in a pixel value.
Figure 9B:
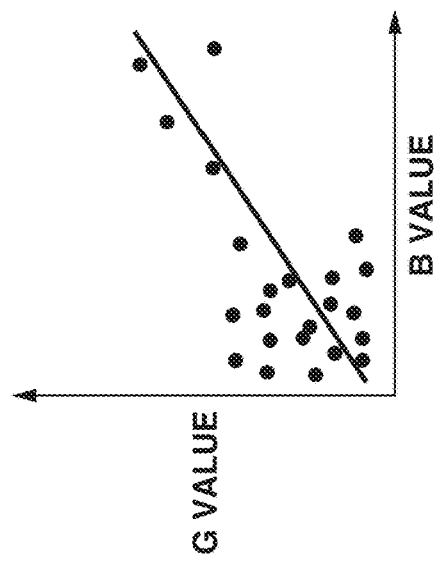
Figure 9C:
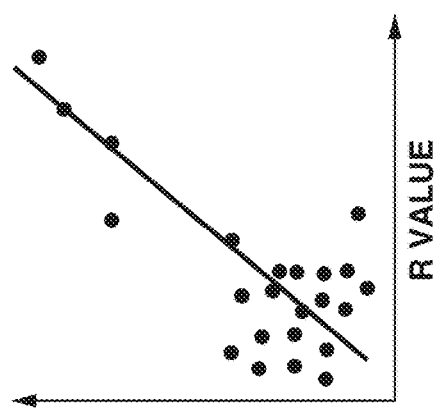
Figure 9D:
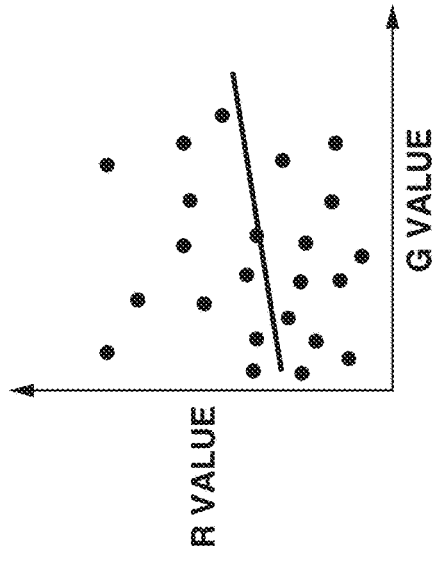
Figure 9E:
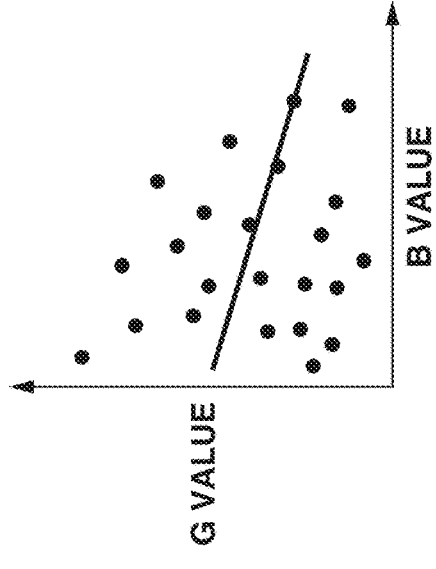
Figure 9F:
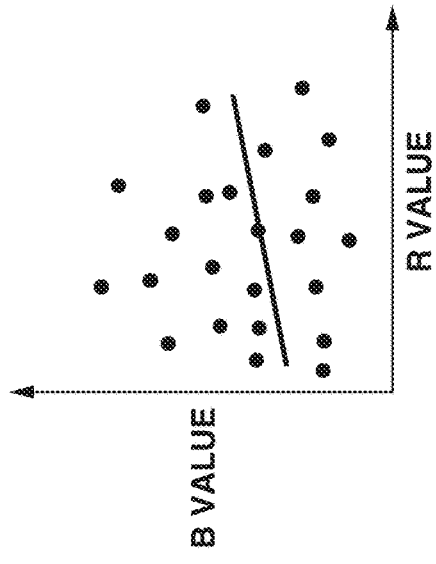

In step S3031, the transformed image data acquisition unit 2031 acquires the plurality of pieces of transformed image data and the information regarding the geometric condition corresponding to each of the plurality of pieces of transformed image data when the image of the object is captured. In step S3032, with respect to each pixel position in each of the geometrically transformed captured images, using a plurality of pixel values obtained under different geometric conditions, the calculation unit 2032 calculates correlation information representing the degree of correlation between colors. In this case, the "correlation between colors" refers to at least one of the correlation between the R and G values, the correlation between the G and B values, and the correlation between the B and R values. In the present exemplary embodiment, a correlation coefficient is determined as a value representing the degree of correlation. FIGS. 9A, 9B, 9C, 9D, 9E, and 9F are scatter diagrams illustrating the correlations between the R, G, and B values. FIGS. 9A, 9B, and 9C are scatter diagrams illustrating a relationship between the R and G values, a relationship between the G and B values, and a relationship between the B and R values, respectively, at the coordinates (x1, y1) in FIG. 5B. FIGS. 9D, 9E, and 9F are scatter diagrams illustrating a relationship between the R and G values, a relationship between the G and B values, and a relationship between the B and R values, respectively, at the coordinates (x2, y2) in FIG. 5B. A point plotted in FIGS. 9A, 9B, 9C, 9D, 9E, and 9F indicates a relationship between two color values obtained by capturing an image of the object under a plurality of geometric conditions at the same pixel position. In each graph, a straight line is an approximate straight line based on the plotted points. At the coordinates (x1, y1) where the object has a high reflectance peak, the correlation between the colors is higher than that at the coordinates (x2, y2) where the object does not have a high reflectance peak. To calculate the correlation coefficient, a known Pearson's product-moment correlation coefficient is used. When the pixel values of the colors between which the correlation is calculated are a; and b, (i is an identification number of the pixel), a correlation coefficient r is calculated using Formula (1).

$$r = \frac{\sum_{i=1}^{n}(a_i - a_{ave})(b_i - b_{ave})}{\left\{\left(\sum_{i=1}^{n}(a_i - a_{ave})^2\right)\left(\sum_{i=1}^{n}(b_i - b_{ave})^2\right)\right\}^{\frac{1}{2}}}$$

Formula (1)

In Formula (1), each of $a_{ave}$ and $b_{ave}$ is an average value of the pixel values of any two colors of the R, G, and B in the image. Regarding the identification number of the pixel, for example, if the number of geometrically transformed captured images used to calculate the correlation coefficient at the coordinates (x1, y1) is 10, numbers 1 to 10 are assigned to the pixels at the coordinates (x1, y1) in the respective captured images.

In step S3033, based on the correlation coefficient represented by the correlation information, the generation unit 2033 determines, with respect to each pixel position in the image, whether the pixel has a reflectance peak corresponding to the reflection characteristic of the object. Then, the generation unit 2033 generates an attribute value map having a determination result as an attribute value. The attribute value map is binary data having a pixel value of 1 or 0 at each pixel. In this case, 1 indicates that the pixel has a reflectance peak corresponding to the reflection characteristic of the object, and 0 indicates that the pixel does not have a reflectance peak corresponding to the reflection characteristic of the object. The generation unit 2033 determines whether the three correlation coefficients between colors are larger than a predetermined threshold. If at least one of the correlation coefficients is larger than the threshold, the generation unit 2033 sets the pixel value in the attribute value map to 1. If all the correlation coefficients are less than or equal to the threshold, the generation unit 2033 sets the pixel value in the attribute value map to 0. The generation unit 2033 outputs the generated attribute value map to a storage device such as the HDD 113.

Effects of First Exemplary Embodiment

As described above, the image processing apparatus according to the present exemplary embodiment acquires a plurality of pieces of color image data representing a plurality of color images. The image processing apparatus determines the degree of correlation between at least two color values among a plurality of types of color values included in each of a plurality of pixel values corresponding to a pixel position in the plurality of color images. Based on the determined degree of correlation, the image processing apparatus determines whether a feature related to a direction of light reflected from an object appears in the plurality of pixel values corresponding to the pixel position. Consequently, it is possible to identify whether a reflectance peak obtained based on a captured image of an object is a reflectance peak corresponding to the reflection characteristic of the object. For example, in a case where a painted surface including a metal flake and having a high reflectance is an object to be measured, a difference between a reflectance peak due to the metal flake and a reflectance of a region other than the metal flake is small. Consequently, the reflectance peak due to the metal flake is buried in noise. Thus, it is difficult to determine the attribute of the peak with high accuracy by simply comparing the pixel value in an image with a threshold. Based on a method according to the present exemplary embodiment, even in a case where the painted surface including the metal flake and having the high reflectance is the object to be measured, the degree of correlation between the color values is compared with the threshold. Thus, it is possible to determine the peak with higher accuracy. The same applies to a case where a region having a low reflectance includes a flake having a low reflectance.

In the first exemplary embodiment, based on the correlation coefficient between the colors in the pixel value, it is identified whether the reflectance peak that appears in the captured image is the reflectance peak corresponding to the reflection characteristic of the object. In a second exemplary embodiment, based on the attribute value map obtained in the first exemplary embodiment, two-dimensional distribution of the reflection characteristic of the object is calculated. The hardware configuration of an image processing apparatus according to the present exemplary embodiment is similar to that according to the first exemplary embodiment, and therefore the configuration is not described here. Differences between the present exemplary embodiment and the first exemplary embodiment are mainly described below. Similar components are described by being indicated with the same reference signs.

Functional Configuration of Image Processing Apparatus

Figure 10:
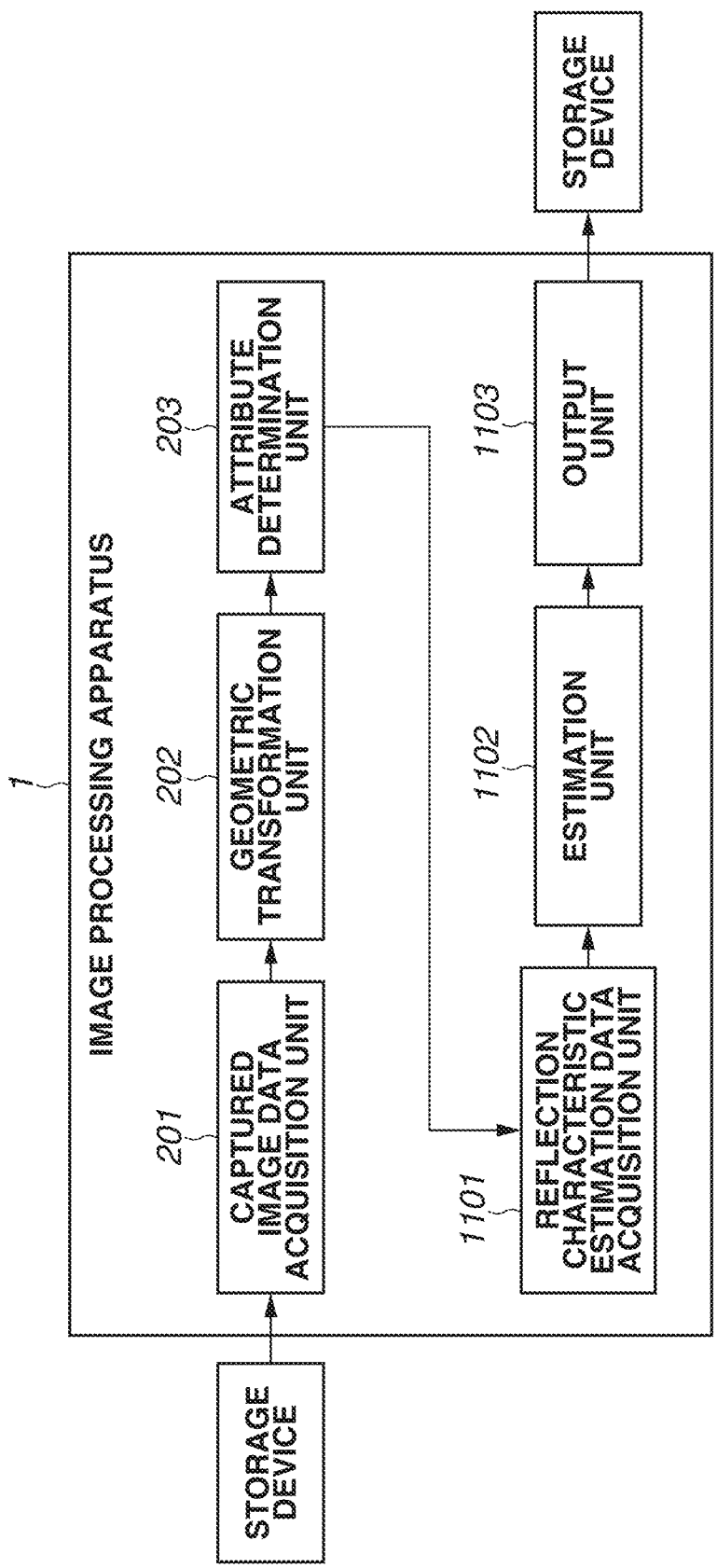
FIG. 10 is a block diagram illustrating a functional configuration of an image processing apparatus.

FIG. 10 is a block diagram illustrating the functional configuration of the image processing apparatus 1. The CPU 101 functions as functional components illustrated in FIG. 10 by reading and executing a program stored in the ROM 102 or the HDD 113 using the RAM 103 as a work memory. Not all the processing illustrated below needs to be executed by the CPU 101. The image processing apparatus 1 may be configured so that part or all of the processing is executed by one or more processing circuits other than the CPU 101.

The image processing apparatus 1 includes a captured image data acquisition unit 201, a geometric transformation unit 202, an attribute determination unit 203, a reflection characteristic estimation data acquisition unit 1101, an estimation unit 1102, and an output unit 1103. The reflection characteristic estimation data acquisition unit 1101 acquires, as reflection characteristic estimation data, a plurality of pieces of transformed image data, information regarding geometric conditions corresponding to the respective pieces of transformed image data when images of an object are captured, and an attribute value map. Based on the reflection characteristic estimation data, the estimation unit 1102 estimates the two-dimensional distribution of the reflection characteristic of the object. The output unit 1103 outputs reflection characteristic data representing the reflection characteristic estimated by the estimation unit 1102 to a storage device such as the HDD 113.

Flow of Processing of Image Processing Apparatus

Figure 11:
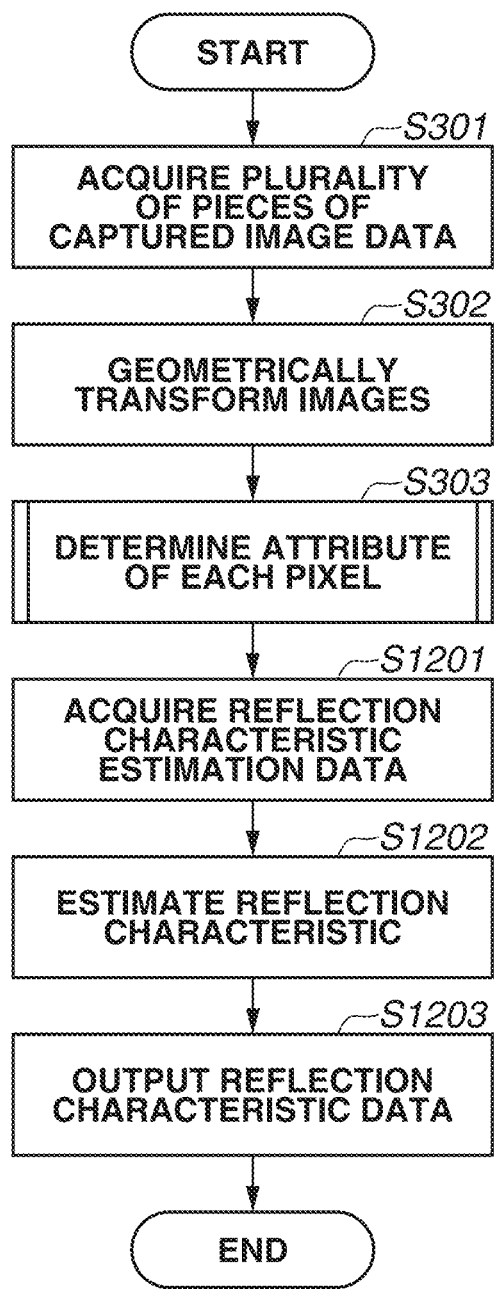
FIG. 11 is a flowchart illustrating processing of the image processing apparatus.

FIG. 11 is a flowchart illustrating processing executed by the image processing apparatus 1. With reference to FIG. 11, details of the processing executed by the image processing apparatus 1 are described below. The processing illustrated in the flowchart in FIG. 11 is started by the user inputting an instruction via the input device 110 and the CPU 101 receiving the input instruction.

Processes of steps S301 to S303 are similar to those in the first exemplary embodiment, and therefore the processes are not described here. In step S1201, the reflection characteristic estimation data acquisition unit 1101 acquires reflection characteristic estimation data from the attribute determination unit 203. As described above, the reflection characteristic estimation data includes the plurality of pieces of transformed image data, the information regarding geometric conditions corresponding to the respective pieces of transformed image data when images of an object are captured, and the attribute value map.

Figure 12A:
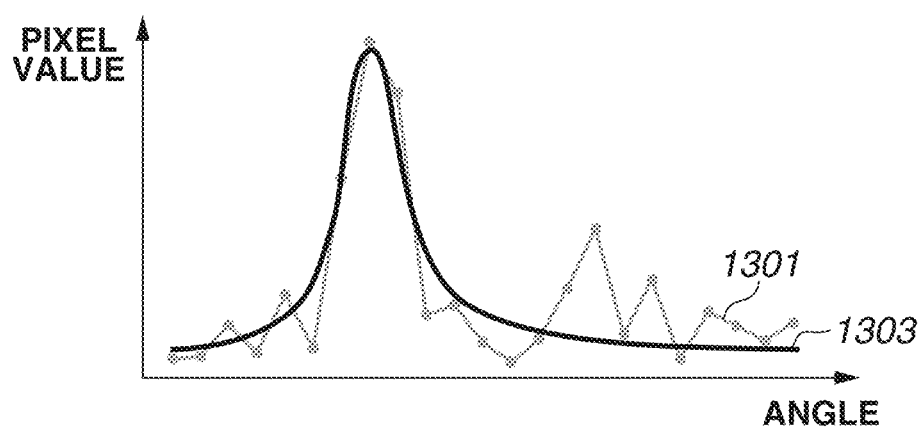
FIGS. 12A and 12B are graphs illustrating examples of a reflection characteristic.
Figure 12B:
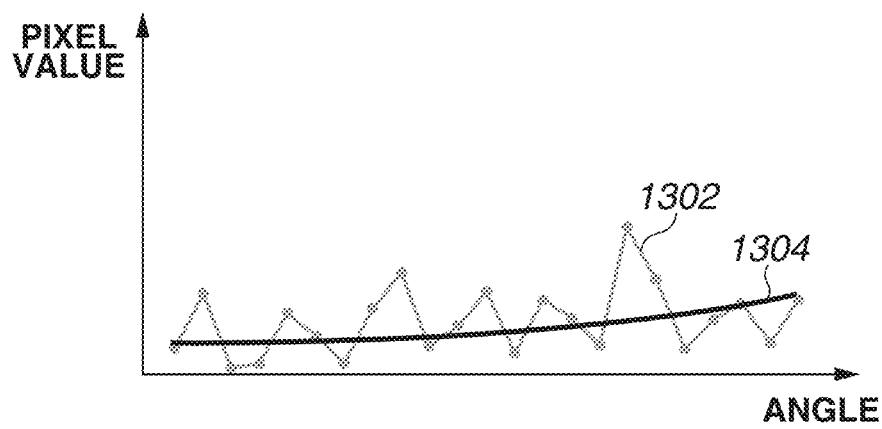

In step S1202, based on the reflection characteristic estimation data, the estimation unit 1102 estimates the two-dimensional distribution of the reflection characteristic of the object. FIGS. 12A and 12B illustrate reflection characteristics estimated at the coordinates (x1, y1) and the coordinates (x2, y2), respectively, in FIG. 5B according to the first exemplary embodiment. A pixel value 1301 is the pixel value at the coordinates (x1, y1). A pixel value 1302 is the pixel value at the coordinates (x2, y2). A reflection characteristic 1303 is a variable angle reflection characteristic estimated based on the pixel value 1301 and the attribute value at the coordinates (x1, y1). A reflection characteristic 1304 is a reflection characteristic estimated based on the pixel value 1302 and the attribute value at the coordinates (x2, y2). Based on the fact that the attribute value at the coordinates (x1, y1) is 1, the estimation unit 1102 estimates the reflection characteristic by approximating the reflection characteristic at the coordinates (x1, y1) using a reflection model having a peak. As the reflection model having a peak, for example, a reflection model represented by a known Gaussian function, a Phong model, or a Torrance-Sparrow model can be used. Based on the fact that the attribute value at the coordinates (x2, y2) is 0, the estimation unit 1102 estimates the reflection characteristic by approximating the reflection characteristic at the coordinates (x2, y2) using a reflection model that does not have a peak, a monotonically increasing function, or a monotonically decreasing function. As the reflection model that does not have a peak, for example, a known Oren-Nayar model can be used. As described above, the estimation unit 1102 estimates the reflection characteristic for each pixel using a reflection model corresponding to the attribute value. The estimation unit 1102 generates the reflection characteristic data having a parameter representing the estimated reflection characteristic for each pixel.

In step S1203, the output unit 1103 outputs the reflection characteristic data generated by the estimation unit 1102 to a storage device such as the HDD 113.

Effects of Second Exemplary Embodiment

As described above, based on information identifying whether the reflectance peak obtained based on a captured image including an object is the reflectance peak corresponding to the reflection characteristic of the object, the image processing apparatus according to the present exemplary embodiment estimates the two-dimensional distribution of the reflection characteristic of the object. Consequently, it is possible to estimate the reflection characteristic using a suitable reflection model at each pixel position. Thus, it is possible to estimate the reflection characteristic with high accuracy.

Modifications

In the above-described exemplary embodiments, an image obtained by capturing an object by fixing the incident angle of light on the object while changing the light-receiving angle of the imaging apparatus 111 are used. However, the image capturing condition is not limited to the above example. For example, the image of the object may be captured by fixing the light-receiving angle of the imaging apparatus 111 while changing the incident angle of light on the object. The image of the object may also be captured while changing both the incident angle and the light-receiving angle.

In the above-described exemplary embodiments, captured image data is acquired, and a captured image represented by the acquired captured image data is geometrically transformed. However, transformed image data obtained by geometrically transforming the captured image in advance may be directly acquired.

In the above-described exemplary embodiments, with respect to each pixel, the attribute of a peak is determined, and the reflection characteristic is estimated. However, the processing may not be performed with respect to each pixel. For example, the processing may be performed with respect to each region including a plurality of pixels (i.e., a pixel group).

In the above-described exemplary embodiments, a geometric transformation process is performed using a known affine transformation. However, the geometric transformation process is not limited to the above example. For example, a geometric deformation process may be performed based on the above-described information regarding the geometric condition.

In the above-described embodiments, when it is determined whether each pixel has a reflectance peak corresponding to the reflection characteristic of the object, a correlation coefficient between colors is calculated in the pixel value as an attribute regarding a reflectance peak. However, information representing the degree of correlation between the colors in the pixel value is not limited to the correlation coefficient. For example, it is determined whether pixel values at each pixel position in an image represented by captured image data are larger than a predetermined threshold. Color values corresponding to the same geometric condition are compared, and if there are color values that have the same determination result, the geometric condition corresponding thereto is counted. If the number of geometric conditions that are counted is large, the attribute value at the pixel position is set to 1.

In the above-described exemplary embodiments, the correlation coefficient between the R and G values, the correlation coefficient between the G and B values, and the correlation coefficient between the B and R values are calculated. However, not all the three correlation coefficients need to be calculated. For example, an average color of an image may be calculated based on the pixel values, and only the correlation coefficient between two colors close to the calculated average color among R, G, and B may be calculated. For example, if the color of an object is purple, the attribute value is determined based on the correlation coefficient between the R and B values.

In the above-described exemplary embodiments, the correlation coefficient is a Pearson's product-moment correlation coefficient. However, the method for calculating the correlation coefficient is not limited to the above example. For example, the calculation method may be a known Spearman's rank correlation coefficient or a known Kendall's rank correlation coefficient.

In the above-described exemplary embodiments, the geometric transformation unit 202 performs a geometric transformation process on images represented by a plurality of pieces of captured image data acquired by the captured image data acquisition unit 201 to associate the same region between the images. However, the image processing apparatus 1 may include a transformed image data acquisition unit that acquires transformed image data generated in advance instead of the captured image data acquisition unit 201 and the geometric transformation unit 202. In this case, the transformed image data acquisition unit acquires, from a storage device such as the HDD 113, a plurality of pieces of transformed image data representing a plurality of transformed images that are obtained by performing a geometric transformation process on captured images in advance and in which a position on an object is associated with the same pixel position between the images. Further, the geometric transformation process may not be performed as long as the position on the object is associated with the same pixel position between the images. For example, a feature amount of the image may be calculated, and the position on the object and the pixel position may be associated with each other based on the feature amount. In this case, in the process of calculating the correlation coefficient, information indicating a correspondence relationships between pixels is used separately from the plurality of pieces of captured image data.

Figure 14:
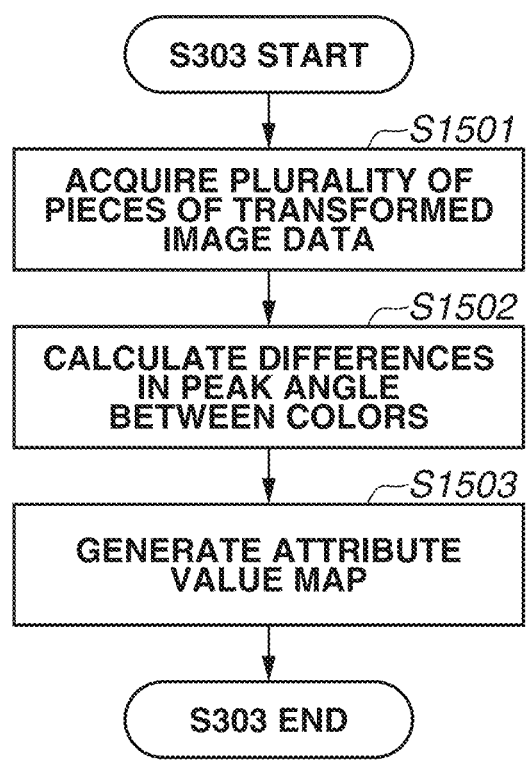
FIG. 14 is a flowchart illustrating processing performed by an image processing apparatus.

In the above-described exemplary embodiments, based on the correlation coefficient between colors, it is determined, with respect to each pixel position in an image, whether the pixel has a reflectance peak corresponding to the reflection characteristic of an object. However, a peak may be determined without using the correlation coefficient. For example, before the attribute value is determined, each of a plurality of R values, a plurality of G values, and a plurality of B values corresponding to the same pixel position is approximated to a reflection model, and an angle at which a reflectance peak occurs (hereinafter referred to as a peak angle) is identified. If at least one of differences between the peak angles corresponding to the R, G, and B values is smaller than a predetermined angle set in advance, the attribute value is set to 1. FIG. 14 is a flowchart illustrating processing executed by the attribute determination unit 203. With reference to FIG. 14, details of the processing executed by the attribute determination unit 203 are described.

In step S1501, the transformed image data acquisition unit 2031 acquires the plurality of pieces of transformed image data and the information regarding the geometric condition corresponding to each of the plurality of pieces of transformed image data when images of the object are captured. In step S1502, with respect to each pixel position in each of the geometrically transformed captured images, using a plurality of pixel values obtained under different geometric conditions, the calculation unit 2032 calculates the peak angles corresponding to the R, G, and B. FIGS. 15A, 15B, 15C, 15D, 15E, and 15F are graphs illustrating the relationship between the geometric condition and the pixel value at each coordinate point of the coordinates (x1, y1) and the coordinates (x2, y2) in FIGS. 5A and 5B. FIGS. 15A, 15B, and 15C are graphs corresponding to the coordinates (x1, y1). FIGS. 15D, 15E, and 15F are graphs corresponding to the coordinates (x2, y2). In each graph, an approximate curve is a curve obtained by approximating the pixel value using a Gaussian function. A dashed-dotted line indicates the peak angle. In step S1503, based on the peak angles, the generation unit 2033 determines, with respect to each pixel position in the image, whether the pixel has a reflectance peak corresponding to the reflection characteristic of the object. Then, the generation unit 2033 generates an attribute value map having a determination result as an attribute value. More specifically, if at least one of the difference in peak angle between the R and G values, the difference in peak angle between the G and B values, and the difference in peak angle between the B and R values is smaller than a predetermined angle set in advance, the attribute value is set to 1. If the difference in peak angle between the R and G values, the difference in peak angle between the G and B values, and the difference in peak angle between the B and R values are all greater than or equal to the predetermined angle set in advance, the attribute value is set to 0.

In the second exemplary embodiment, using information regarding the attribute value, noise in estimating the two-dimensional distribution of the reflection characteristic is reduced. The attribute value calculated in the first exemplary embodiment can be used for a purpose other than reduction of the noise in estimating the reflection characteristic. For example, the attribute value can be used to evaluate a surface of the object. The number of reflectance peaks on the surface of the object may be evaluated, or a characteristic of the surface where positions of minute bright points change in a sparkling manner with a change in the position of the light source or a change in the observation angle (a feeling of brightness) may be evaluated. A degree of metallic appearance may be evaluated. The object may also be evaluated using reflection characteristic estimated in the second exemplary embodiment. Possible examples of a reflection characteristic parameter used for the evaluation include intensity of specular reflection light, spread of specular reflection light, and intensity of diffuse reflectance light. Consequently, it is possible to evaluate an object using a method close to human vision. The image processing apparatus 1 according to each of the above-described exemplary embodiments may further include an evaluation unit that performs the above-described evaluation.

In the second exemplary embodiment, to estimate the reflection characteristic of one pixel of interest, one pixel value of the pixel of interest is used with respect to each geometric condition. However, accuracy of approximation of the reflection model may be enhanced by further using the pixel values of neighboring pixels of the pixel of interest. By this method, it is possible to reduce an influence of noise contained in the pixel value. In this case, the pixel value of the neighboring pixel to be referenced may be selected using an attribute value map. FIG. 13 is a diagram illustrating an example of the attribute value map. A reflection model is approximated by referencing the pixel value of each of the neighboring pixels that is the same as the attribute value of the pixel of interest, whereby it is possible to estimate the reflection characteristic at the pixel of interest with high accuracy. In FIG. 13, neighboring pixels to be referenced with respect to a pixel of interest 1401 are a group of pixels surrounded by a frame 1404. Neighboring pixels to be referenced with respect to a pixel of interest 1402 are a group of pixels surrounded by a frame 1405, except for one pixel having the attribute value of 1. Regarding a pixel of interest 1403, a pixel having the same attribute value is not present near the pixel of interest 1403 within a frame 1406. Thus, the pixel values of the neighboring pixels are not referenced.

In the above-described exemplary embodiments, the reflectance peak that occurs based on reflection from a flake in metallic painting is determined. However, the reflectance peak due to surface unevenness of an object may be determined. For example, in an object having a complex refractive index with low wavelength selectivity, a reflectance peak due to the surface unevenness of the object has a high correlation between colors. Thus, it is possible to distinguish the peak from noise through the above processing. In an object having a complex refractive index with high wavelength selectivity, spectral distribution of light reflected from a surface of the object falls rarely within a single bandwidth of R, G, and B color filters. Thus, similarly, it is possible to distinguish the peak from noise through the above processing. In other words, in the above-described exemplary embodiments, it is possible to determine whether a feature related to a direction of light reflected from an object, such as reflection from a flake included in the object or reflection due to the surface unevenness of the object, appears in a pixel value.

In the exemplary embodiments of the disclosure, it is possible to identify whether a reflectance peak obtained based on a captured image of an object is a reflectance peak corresponding to the reflection characteristic of the object.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-204382, filed Oct. 30, 2018, and No. 2019-129615, filed Jul. 11, 2019, which are hereby incorporated by reference herein in their entirety.

What is claimed is:

1. A processing apparatus comprising: a processor; a memory coupled to the processor storing instructions that, when executed by the processor, cause the processor to function as: an acquisition unit configured to acquire a plurality of color images, the plurality of color images being obtained by capturing images of an object under a plurality of geometric conditions depending on a position of an imaging apparatus and a position of a light source that emits light to the object and a color of each pixel in the plurality of color images being represented by a plurality of types of color values;
  a determining unit configured to determine a degree of correlation between at least two color values among the plurality of types of color values included in each of a plurality of pixel values corresponding to a pixel position in the plurality of color images; and
  the determination unit configured to determine, based on the determined degree of correlation, whether a peak in change in the plurality of pixel values corresponding to the geometric conditions is a reflectance peak corresponding to a reflection characteristic of the object or a peak due to noise included in the color images.

2. The processing apparatus according to claim 1, wherein the determining unit determines a correlation coefficient between the at least two color values, and
  wherein the determination unit makes the determination based on the determined correlation coefficient.

3. The processing apparatus according to claim 1, wherein the plurality of types of color values is a red (R) value, a green (G) value, and a blue (B) value.

4. The processing apparatus according to claim 2, wherein the determination unit determines at least one of a correlation coefficient between an R value and a G value, a correlation coefficient between the G value and a B value, and a correlation coefficient between the B and R values.

5. The processing apparatus according to claim 4, wherein, based on an average value of pixel values in the color images, the determination unit determines any one of the correlation coefficient between the R and G values, the correlation coefficient between the G and B values, and the correlation coefficient between the B and R values.

6. The processing apparatus according to claim 4, wherein in a case where at least one of the correlation coefficient between the R and G values, the correlation coefficient between the G and B values, and the correlation coefficient between the B and R values is larger than a predetermined threshold, the determination unit identifies that a peak in change in the plurality of pixel values corresponding to the geometric conditions is a reflectance peak corresponding to a reflection characteristic of the object.

7. The processing apparatus according to claim 4, wherein the correlation coefficient is a Pearson's product-moment correlation coefficient.

8. The processing apparatus according to claim 4, wherein the correlation coefficient is a Spearman's rank correlation coefficient.

9. The processing apparatus according to claim 4, wherein the correlation coefficient is a Kendall's rank correlation coefficient.

10. The processing apparatus according to claim 1, wherein the determination unit approximates change in each of the plurality of types of color values corresponding to the geometric conditions to a function to calculate geometric conditions corresponding to peaks of the color values, and based on the geometric conditions corresponding to the peaks of the color values, determines whether a feature related to a direction of the light reflected from the object appears in the plurality of pixel values corresponding to the pixel position.

11. The processing apparatus according to claim 10, wherein the determination unit determines that the feature related to the direction of the light reflected from the object appears in the plurality of pixel values in a case where a difference between the geometric conditions corresponding to the peaks of the plurality of types of color values is smaller than a predetermined threshold.

12. The processing apparatus according to claim 1, wherein the determination unit determines whether each of the plurality of pixel values is larger than a predetermined threshold, and in a case where there are a large number of pixels having two or more color values among the plurality of types of color values that are larger than the predetermined threshold, the determination unit determines that a peak in change in the plurality of pixel values corresponding to the geometric conditions is a reflectance peak corresponding to a reflection characteristic of the object.

13. The processing apparatus according to claim 1, the processor further functions as an estimation unit configured to estimate a reflection characteristic of the object based on the plurality of color images and information regarding geometric conditions corresponding to each of the plurality of color images data when the images of the object are captured.

14. The processing apparatus according to claim 13, wherein the estimation unit selects a reflection model used to estimate the reflection characteristic based on a determination result of the determination unit.

15. The processing apparatus according to claim 13, wherein the estimation unit selects a neighboring pixel to be referenced to estimate the reflection characteristic of a pixel of interest based on a determination result of the determination unit.

16. The processing apparatus according to claim 1, wherein a feature related to a direction of the light reflected from the object is a feature of reflection from a flake included in the object.

17. The processing apparatus according to claim 1, wherein a feature related to a direction of the light reflected from the object is a feature of reflection due to surface unevenness of the object.

18. A processing method comprising:
  acquiring a plurality of color images, the plurality of color images being obtained by capturing images of an object under a plurality of geometric conditions depending on a position of an imaging apparatus and a position of a light source that emits light to the object and a color of each pixel in the plurality of color images being represented by a plurality of types of color values;
  determining a degree of correlation between at least two color values among the plurality of types of color values included in each of a plurality of pixel values corresponding to a pixel position in the plurality of color images; and
  determining, based on the determined degree of correlation, whether a peak in change in the plurality of pixel values corresponding to the geometric conditions is a reflectance peak corresponding to a reflection characteristic of the object or a peak due to noise included in the color images.

19. A non-transitory computer-readable storage medium storing instructions that, when executed by a computer, cause the computer to perform a processing method, the processing method comprising:

acquiring a plurality of color images, the plurality of color images being obtained by capturing images of an object under a plurality of geometric conditions depending on a position of an imaging apparatus and a position of a light source that emits light to the object and a color of each pixel in the plurality of color images being represented by a plurality of types of color values;

determining a degree of correlation between at least two color values among the plurality of types of color values included in each of a plurality of pixel values corresponding to a pixel position in the plurality of color images; and determining, based on the determined degree of correlation, whether a peak in change in the plurality of pixel values corresponding to the geometric conditions is a reflectance peak corresponding to a reflection characteristic of the object or a peak due to noise included in the color images.

* * * * *